United States Patent
Chopra et al.

(10) Patent No.: US 9,575,738 B1
(45) Date of Patent: Feb. 21, 2017

(54) METHOD AND SYSTEM FOR DEPLOYING SOFTWARE TO A CLUSTER

(71) Applicant: EMC Corporation, Hopkinton, MA (US)

(72) Inventors: Shelesh Chopra, Bangalore (IN);
Vladimir Mandic, San Jose, CA (US);
Sudha Narayanan, Bangalore (IN);
Preeti Varma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 13/792,992

(22) Filed: Mar. 11, 2013

(51) Int. Cl.
G06F 9/445 (2006.01)
G06F 9/44 (2006.01)
G06F 11/20 (2006.01)

(52) U.S. Cl.
CPC ............. G06F 8/60 (2013.01); G06F 11/2023 (2013.01)

(58) Field of Classification Search
CPC ............. H04L 41/0893; H04L 67/1029; H04L 67/1034; H04L 67/327; H04L 47/125; H04L 49/354; G06F 11/2023; G06F 11/2025; G06F 8/61; G06F 8/65; G06F 8/60; G06F 8/71; G06F 17/30356; G06F 11/3433
See application file for complete search history.

(56) References Cited

U.S. PATENT DOCUMENTS

| | | | | |
|---|---|---|---|---|
| 6,529,784 B1 * | 3/2003 | Cantos et al. | .................. | 700/79 |
| 7,681,193 B2 * | 3/2010 | Oprea | ....................... | G06F 8/61 717/168 |
| 7,779,406 B2 * | 8/2010 | Blanding | .................. | G06F 8/61 717/172 |
| 7,865,889 B1 * | 1/2011 | Bird | ......................... | G06F 8/60 717/168 |
| 7,903,543 B2 * | 3/2011 | Kashyap | ............... | H04L 45/586 370/217 |
| 8,135,775 B1 * | 3/2012 | Anderson et al. | ............ | 709/203 |

(Continued)

OTHER PUBLICATIONS

Jeffrey S. Chasel; Dynamic Virtual Clusters in a Grid Site Manager; 2003 IEEE; 11 pages; <http://ieeexplore.ieee.org/stamp/stamp.jsp?arnumber=1210019>.*

(Continued)

*Primary Examiner* — Thuy Dao
*Assistant Examiner* — Cuong V Luu
(74) *Attorney, Agent, or Firm* — Dergosits & Noah LLP; Todd A. Noah

(57) ABSTRACT

Disclosed are systems and methods relating to the deployment of an application. A plurality of nodes in one or more clusters of nodes may be identified. Inventory information for each of the plurality of nodes may be retrieved. The inventory information may provide configuration and state information associated with each node. For example, the inventory information retrieved from the plurality of nodes may include an internet protocol address or a hostname associated with each the plurality of nodes, and a version of software installed on each of the plurality of nodes. An order for deploying the software application may be determined based on the retrieved inventory information. The order may identify a sequence in which the software application is deployed to at least one of the plurality of nodes. The software application may be deployed to at least one of the plurality of nodes based on the determined order.

20 Claims, 8 Drawing Sheets

(56) References Cited

U.S. PATENT DOCUMENTS

| | | | | |
|---|---|---|---|---|
| 8,589,727 | B1* | 11/2013 | Fletcher et al. | 714/13 |
| 8,627,311 | B2* | 1/2014 | Auer | 717/176 |
| 8,782,632 | B1* | 7/2014 | Chigurapati | G06F 8/65 717/168 |
| 8,806,475 | B2* | 8/2014 | Xie | G06F 8/60 717/172 |
| 2004/0073903 | A1* | 4/2004 | Melchione | G06F 8/60 717/172 |
| 2005/0022202 | A1* | 1/2005 | Sannapa Reddy et al. | 718/105 |
| 2006/0200818 | A1* | 9/2006 | Oprea | G06F 8/61 717/174 |
| 2009/0073875 | A1* | 3/2009 | Kashyap | H04L 45/586 370/228 |
| 2009/0313630 | A1* | 12/2009 | Hori | 718/102 |
| 2011/0283138 | A1* | 11/2011 | Sangubhatla et al. | 714/15 |
| 2012/0059864 | A1* | 3/2012 | Bandyopadhyay et al. | 707/827 |
| 2012/0066674 | A1* | 3/2012 | Xie | G06F 8/60 717/174 |
| 2012/0198438 | A1* | 8/2012 | Auer | 717/176 |
| 2013/0179876 | A1* | 7/2013 | Aliminati | H04L 41/0893 717/177 |
| 2014/0096125 | A1* | 4/2014 | Kimmet | G06F 8/65 717/172 |
| 2014/0245279 | A1* | 8/2014 | Ohtake | G06F 9/445 717/170 |

OTHER PUBLICATIONS

Geoffroy Vallee; System Management Software for Virtual Environments; 2007 ACM; pp. 153-160; <http://dl.acm.org/citation.cfm?id=1242555>.*
Areski Flissi; A Generic Deployment Framework for Grid Computing and Distributed Applications; 2006 Springer; pp. 1402-1411; <http://link.springer.com/chapter/10.1007/11914952_26>.*
Justin Cappos; Seattle A Platform for Educational Cloud Computing; 2009 ACM; pp. 111-115; <http://dl.acm.org/citation.cfm?id=1508905>.*
Gideon Juve; Automating Application Deployment in Infrastructure Clouds; 2011 IEEE; pp. 658-665; <http://ieeexplore.ieee.org/stamp/stamp.jsp?arnumber=6133211>.*
George Suciu; Cloud Consulting ERP and Communication Application Integration in Open Source Cloud Systems; 2011 IEEE: pp. 578-581; <http://ieeexplore.ieee.org/stamp/stamp.jsp?arnumber=6143614>.*

* cited by examiner

METHOD AND SYSTEM FOR DEPLOYING SOFTWARE TO A CLUSTER

BACKGROUND

The present invention relates to the field of information technology and more particularly, systems and techniques that relate to deploying a software application in a network environment.

Enterprise application software may be software used by an organization, such as a business, to perform one or more functions or operations associated with the organization. For example, a business may use enterprise application software, such as Documentum® provided by EMU), to organize or manage content associated with the business's operations. Services provided by enterprise application software may be on-demand or online tools such as online payment processing, an interactive product catalogue, automated billing systems, security, enterprise content management, internet technology (IT) service management, customer relationship management, enterprise resource planning, business intelligence, project management, collaboration, human resource management, manufacturing, enterprise application integration, and enterprise forms automation.

Enterprise application software may be hosted by host applications which may be implemented on one or more servers or other network resources. Thus, an enterprise application may be deployed to multiple host applications which may each be used to execute an instance of the enterprise application and provide services associated with the enterprise application. The host applications may each be implemented or associated with a node in a communications network, such as the Internet. Thus, a host application may be associated with and represented as a network node in a communications network. A node may be a physical network node, such as a host computer, which may be identified by an Internet protocol (IP) address.

Nodes may belong to a cluster, which may consist of a set of loosely connected computers that work together and may be viewed as a single system or computational entity. Thus, a cluster of nodes may be identified by a single virtual IP address. A cluster of nodes may include a load balancer (LBR), which may be a server configured to manage computational loads placed on each node in the cluster, and manage the transition of functionality from one node to another in the event of failure of a node. Because clusters of resources often share computational workloads, nodes within the cluster often utilize the same versions of software, such as an enterprise application.

Conventional methods remain limited because they do not provide an efficacious way to deploy application software, such as an enterprise application, to a cluster of nodes.

DETAILED DESCRIPTION

Figure 1:
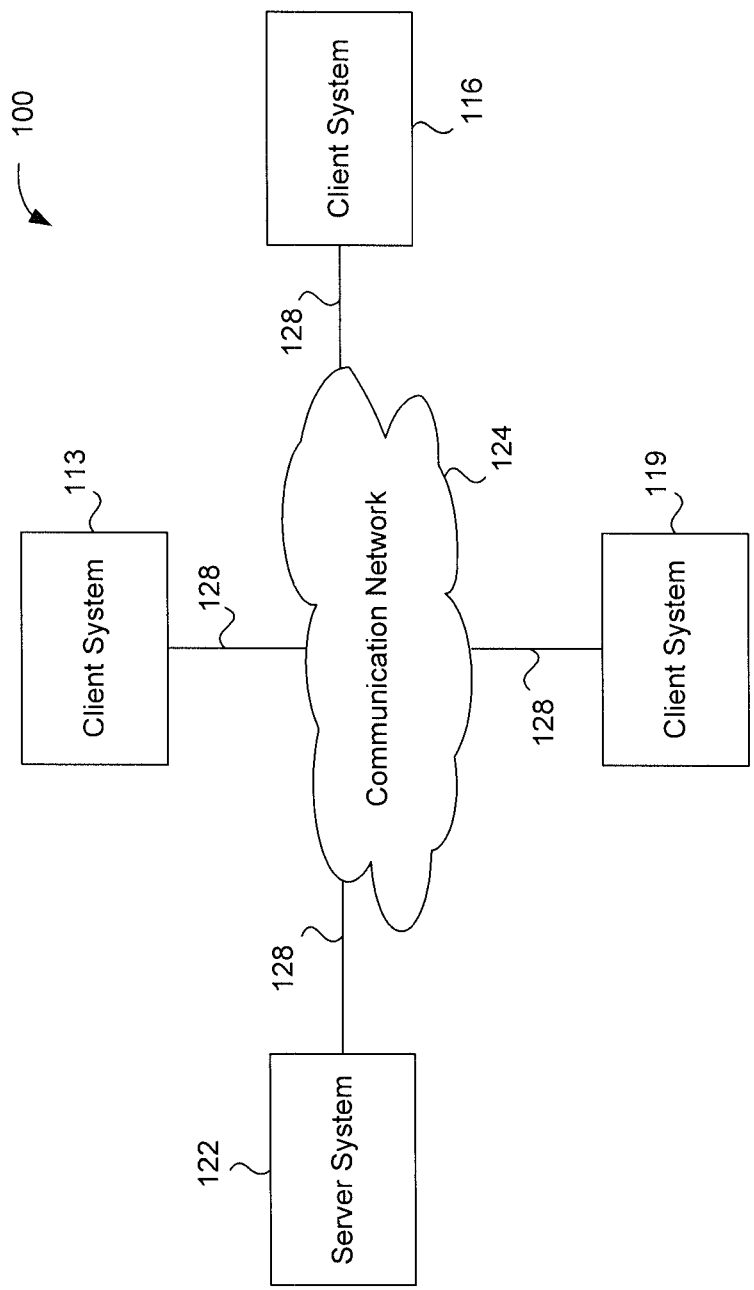
FIG. 1 shows a block diagram of a client-server system and network in which an embodiment of the invention may be implemented.

Some conventional methods and systems of deploying software typically involve an administrator manually performing an installation or upgrade of software on each node. Thus, a node may include a host application used to host an instance of a software application, such as an enterprise application. The administrator may have to manually install the upgraded or new software on each host application individually. Moreover, the administrator is not provided with a unified view of the various different nodes and the software that is currently installed on the nodes. Other conventional methods provide general deployment engines which may deploy software to various different standalone host applications. However, general deployment engines simply deploy the software to multiple standalone host applications. Such general deployment engines are incapable of deploying software to clusters of nodes because general deployment engines are not sensitive to the requirements of load balancing and failover among nodes when software is deployed to a cluster of resources.

Thus, conventional methods do not provide an automated and seamless way to deploy an application to one or more clusters, or to provide information about one or more clusters to an administrator. Conventional methods do not provide a complete pictorial presentation of a cluster environment that can be seen as single unified view, and do not provide a mechanism for an administrator to know which version of software is installed on which node to perform a compliancy check. Moreover, conventional methods require manual intervention to determine if nodes are in a passive or active mode. An active node may be a node that includes resources that are used to provide services associated with an application deployed to that node. A passive node may be a node that does not currently provide services, but is available if an active node fails or becomes over-burdened, as may be determined by a cluster resource, such as a load balancer. Conventional methods do not provide any intelligent mechanism by which active or passive nodes may be identified and software deployed in a cluster environment. Instead, conventional methods view nodes in a cluster as a combination of multiple standalone hosts. Such a view results in poor compatibility with load balancing and failover functionalities, and an administrator is generally unaware if all nodes of a particular cluster have the same version of the software. Often the administrator will only know if a node has an incorrect version of software if some failure or error occurs. Furthermore, conventional methods do not track a history about the nodes (active or passive) or software upgrades. Conventional methods also fail to provide a mechanism for upgrading software in a node based on its dependency on software implemented in another node.

Systems and methods are disclosed herein that provide a centralized cluster deployment engine which installs and upgrades software seamlessly in a cluster environment. A cluster environment may be an environment which includes one or more clusters of nodes that belong to a coherency group. A coherency group may be a single or group of clusters that function together as a single unit or entity to provide failover and load balancing for execution of a software application, such as an enterprise application. Thus, various implementations disclosed herein provide for the upgrade or installation of software in one or more coherency groups based on one or more rules which may be user generated or system generated. A centralized deployment engine may be associated with multiple clusters in a coherency group. In response to determining that a software application should be deployed to the coherency group, the centralized deployment engine may inventory each cluster in the coherency group and retrieve information associated with each node within each cluster. Based on one or more rules, the centralized deployment engine may determine an order in which the software application should be installed on the nodes. The centralized deployment engine may install the software application and maintain a record of any changes that were made.

Furthermore, the centralized deployment engine may generate a clear visual representation of the one or more clusters of nodes within the coherency group. The representation may be rendered and presented to one or more users at a user interface. The visual representation may show information about the coherency group, such as which nodes are included in a cluster, and which nodes are active and passive. The visual representation may also show additional information about the deployment process, such as a software install/upgrade path. The visual representation may help an administrator monitor a deployment process and determine whether all nodes in a cluster are in the same state and have a similar version of software installed.

Thus, various systems and methods disclosed herein provide a clear visual presentation of all nodes in a cluster environment that may be easily interpreted by a system administrator. Moreover, a user may be notified if a cluster is an active-active or an active-passive cluster. The user may also be provided with a list of active and passive nodes. The user may provide an input which configures deployment of a software application to the cluster. Furthermore, a warning may be generated if all nodes in the cluster do not have the same software version. Non-compliant nodes may be upgraded automatically to avoid failures or errors. Furthermore, a complete history is stored and maintained in a database system for all the nodes. The stored information may relate to active/passive history, failover history, and installations of software versions. Furthermore, software may be deployed or upgraded based on identified software dependencies associated with the software application. The upgrades and/or installations may take place in a preferential order that does not interfere with failover or load balancing capabilities within the coherency group.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
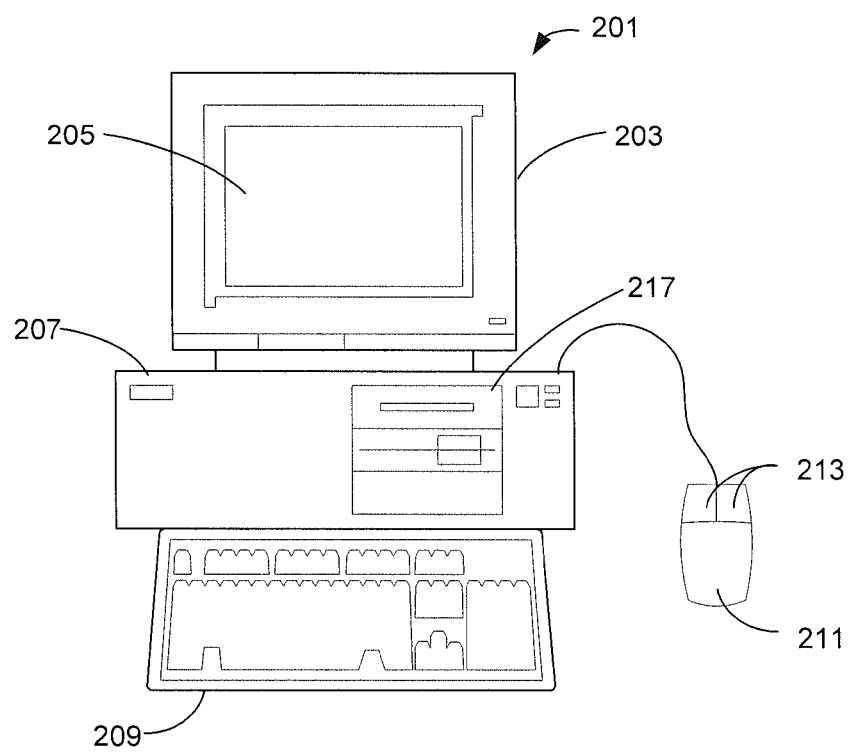
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
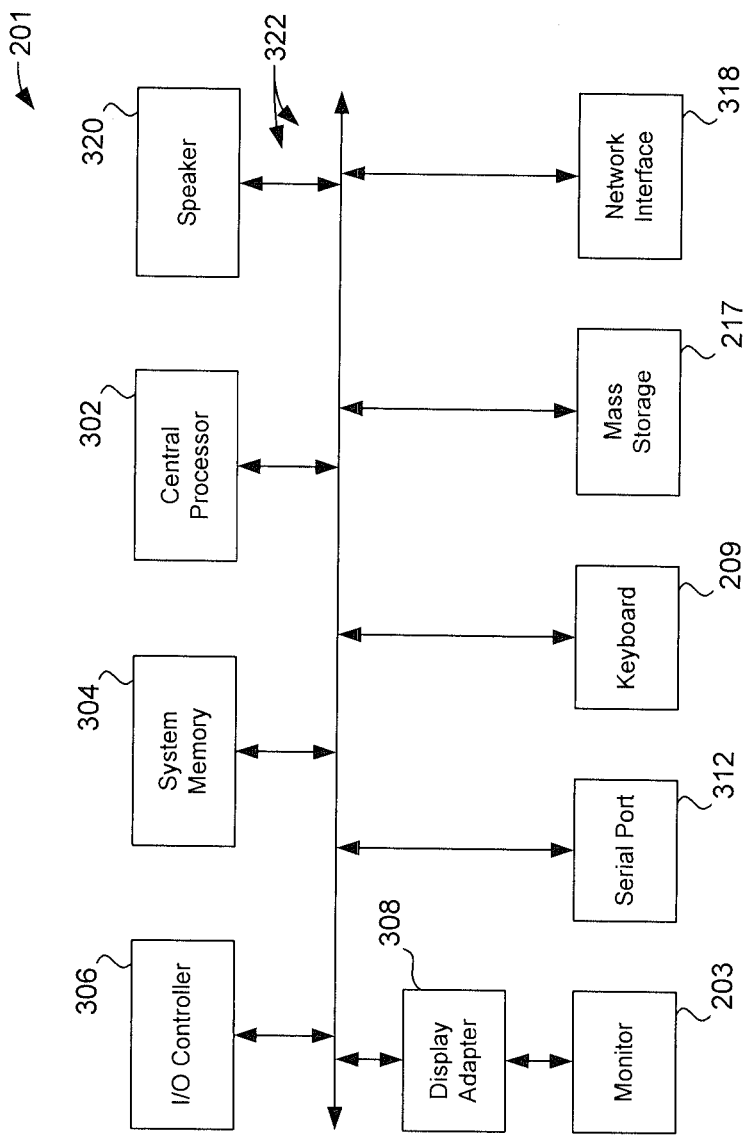
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 4:
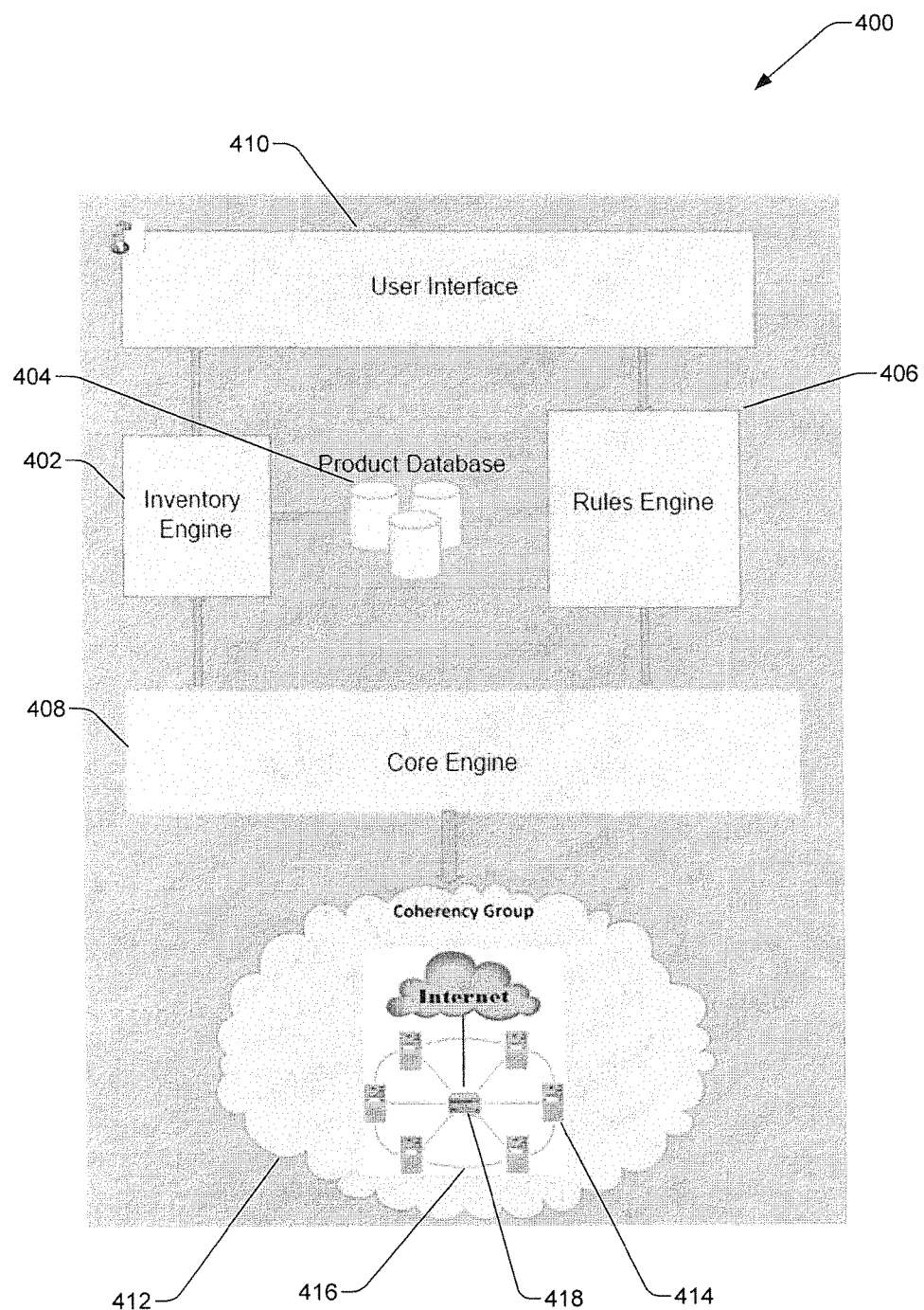
FIG. 4 shows a block diagram of an example of a system for deploying an application to one or more clusters, implemented in accordance with some implementations.

FIG. 4 shows a block diagram of an example of a system for deploying an application to one or more clusters, implemented in accordance with some implementations. System 400 may provide a centralized deployment engine which may install or upgrade software in one or more clusters of one or more coherency groups. The deployment of software may be performed according to user-defined or system defined rules. Thus, a user may configure the process of deploying software to one or more clusters of a coherency group. Moreover, the centralized deployment engine embodied by system 400 may provide the user with information about the deployment process and about the clusters themselves. Thus, a user may be provided with a clear visual representation of various clusters and an implementation of a deployment process within those clusters.

Accordingly, system 400 may include inventory engine 402, which may retrieve and manage various information associated with one or more nodes in one or more clusters of resources. Inventory engine 402 may manage some or all information that is used to deploy an application in one or more clusters of a coherency group. Thus, inventory engine 402 may be configured to query nodes to retrieve information about nodes in a cluster in which an application is to be deployed. Inventory engine 402 may communicate with the nodes directly. Alternatively, inventory engine 402 may communicate with nodes in clusters via core engine 408. Thus, according to some implementations, core engine 408 arbitrates communication between inventory engine 402 and nodes in clusters in which one or more applications are to be deployed.

In some implementations, inventory engine 402 is also configured to communicate with user interface 410. Inventory engine 402 may be configured to receive an input from a user that may identify one or more clusters and/or nodes. Thus, a user may provide an input, such as an IP address or a hostname, that may identify a node or cluster to Which an application is to be deployed. Inventory engine 402 may be configured to query and retrieve information from any associated nodes or clusters which may be relevant to the deployment of the software application to the identified node or cluster. For example, a user may provide an IP address for a particular node in a cluster to indicate that the node should be upgraded to new software. Inventory engine 402 may retrieve inventory information associated with all nodes in the identified cluster.

Accordingly, inventory engine 402 may be a process or application implemented in one or more servers and configured to retrieve configuration information about a node and a cluster in which a node resides. The configuration information may provide information about a configuration of clusters, nodes within clusters, and a software configuration of the nodes. For example, inventory engine 402 may retrieve virtual IP addresses and host names associated with an identified cluster. Inventory engine 402 may also retrieve a cluster type, such as whether or not the cluster is an Active-Passive cluster, which may be a cluster may be a cluster in which there is one active node, and all other nodes are passive, or if the cluster is an Active-Active cluster, which may be a cluster in which more than one node in a cluster is used to provide services associated with an application deployed to that cluster. Furthermore, inventory engine 402 may retrieve a list of nodes included in a cluster. The list of nodes may include an IP address and a hostname for each node in the cluster. Inventory engine 402 may also retrieve information about what software is currently installed at the node. For example, inventory engine 402 may retrieve information that identifies a version of software installed on each node in a cluster. The inventory information may also identify new nodes that have been added to a cluster recently.

Inventory engine 402 may be configured to store the information in one or more storage volumes. For example, inventory engine 402 may store information about nodes and clusters in a data base system, such as product database 404. Inventory engine 402 may store information in product database 404 automatically in response to retrieving information from nodes in clusters. Inventory engine may be further configured to retrieve information from product database 404 when an application is to be deployed to one or more clusters.

System 400 may further include rules engine 406 which may be configured to store one or more sets of rules that may be used to configure the deployment of applications to one or more clusters in one or more coherency groups. Thus, rules engine 406 may include or be in communication with one or more storage volumes configured to store one or more sets of rules. The rules stored and maintained by rules engine 406 may determine an order or protocol which may be used to upgrade or install software on one or more nodes in one or more clusters. In some implementations, rules engine 406 is communicatively coupled to core engine 408 and is used to configure the operations of core engine 408, discussed in greater detail below. Thus, core engine 408 may perform one or more operations according to an order or protocol specified by rules engine 406.

The rules stored in rules engine 406 may be automatically generated or user-defined. For example, upon initial configuration of system 400, default rules may be generated based on one or more predetermined settings. Thus, a system administrator may provide one or more default rules which may be stored in rules engine 406. Rules engine 406 may also be configured to communicate with user interface 410. Thus, rules engine 406 may receive input from a user via user interface 410. The user input may be used to configure the sets of rules stored in rules engine 406. Accordingly, user interface 410 may arbitrate communications between a user and rules engine 406. In this way, rules engine 406 may receive input from a user that may define new user-defined rules, or configure existing rules which may be applied to the deployment of software to nodes in one or more clusters.

Accordingly, system 400 may further include user interface 410 which may be part of a user interface screen presented to a user. User interface 410 may be a process that runs locally on a client machine used by a user. Alternatively, user interface 410 may be a process implemented remotely in one or more servers that communicates with the client machine via a network, such as the Internet. Thus, user interface 410 may be a server-implemented process that communicates with a user at a client machine via an Internet protocol, such as hypertext transfer protocol (HTTP), or an API implemented browser-based communications method. User interface 410 may receive input from a user and provide the input to inventory engine 402 and rules engine 406. Moreover, user interface 410 may receive information from inventory engine 402 and rules engine 406 and present the information to a user at a user interface screen of the user's client machine. Thus, user interface 410 may present a user with information about the application deployment process. For example, user interface 410 may include a rendering engine configured to render information stored in product database 404 as a topographical graphical representation of a cluster. Alternatively, the rendering engine may be a part of inventory engine 402, and user interface 410 may be used to present an image rendered by inventory engine 402. User interface 410 may also display other information, such as a software install/upgrade path. In this way, a user may monitor, modify, and configure the process of deploying an application to nodes in one or more clusters of one or more coherency groups.

In some implementations, system 400 includes core engine 408 which may be implemented in one or more servers and may include software and hardware implemented logic configured to manage the deployment process by performing one or more operations associated with the deployment process. For example, core engine 408 may perform the querying of one or more nodes in a cluster to retrieve inventory information that was requested by and will be stored by inventory engine 402. Furthermore, core engine 408 may perform the actual operations that accomplish the deployment of the application in a cluster. For example, core engine 408 may upgrade or install software in one or more nodes within a cluster according to an order determined based on rules retrieved from rules engine 406. Thus, core engine 408 may be communicatively coupled to a data store that stores the application to be deployed to a cluster. Core engine 408 may be configured to install software from the data store to one or more nodes in a cluster.

System 400 may further include coherency group 412, which may be a group of resources used to provide on-demand services to one or more clients. In some implementations, coherency group 412 is a group of nodes 414 that may include one or more clusters of nodes 416 that all share a virtual IP address. Coherency group 412 may include one or more load balancing servers (LBRs) 418 that manage nodes 414 within coherency group 412 to seamlessly provide load balancing and failover within coherency group 412. Thus, coherency group 412 may include one cluster of nodes and one LBR. Alternatively, coherency group 412 may include several clusters of nodes, and several LBRs. In some implementations, core engine 408 may manage deployment of an application only in coherency group 412. Thus, each coherency group may have its own instance of a core engine. Alternatively, core engine 408 may manage deployment of an application in several coherency groups. Thus, multiple coherency groups may be managed by a single instance of core engine 408.

Figure 5:
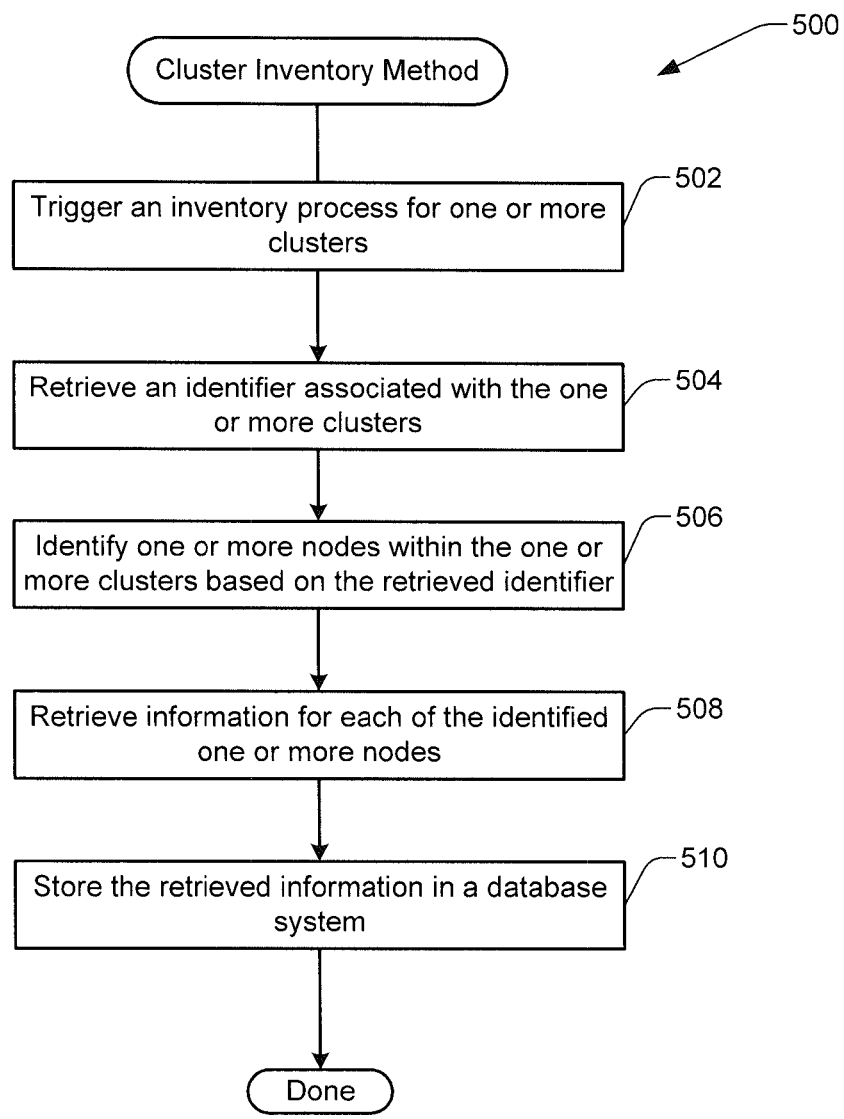
FIG. 5 shows a flowchart of an example of a method for performing an inventory for one or more nodes in a cluster, performed in accordance with some implementations.

FIG. 5 shows a flowchart of an example of a method for performing an inventory for one or more nodes in a cluster, performed in accordance with some implementations. Performing an inventory may retrieve information about one or more nodes in one or more clusters. For example, if a software application, such as an enterprise application, is to be deployed to a cluster of nodes, configuration and system information may be retrieved for each node in the cluster of nodes. The information may provide a complete representation of each node in a cluster, thus enabling a user or a system component, such as a core engine, to determine an order in which the software application should be installed on nodes in the cluster without disrupting failover or load balancing capabilities within the cluster.

Accordingly, at step 502 an inventory process may be triggered. In some implementations, the inventory process is triggered in response to receiving a request to deploy an application to one or more clusters. For example, a system administrator may determine that an upgrade to a deployed software application should be implemented in a cluster of nodes. In response to receiving the request, a user interface may send a message to an inventory engine. The inventory engine may initiate the inventory process in response to receiving the message. Alternatively the inventory process may be triggered automatically according to a predetermined schedule of operations. Thus, an administrator may have previously established a schedule according to which nodes in clusters should be inventoried and inventory information should be retrieved.

At step 504, an identifier associated with one or more clusters may be retrieved. According to various implementations, the identifier may be a virtual IP address or hostname that is used to identify a cluster. As set forth above, a cluster of nodes may share a virtual IP address and appear to a client machine as a single entity. A system component, such as an inventory engine may retrieve the identifier for the cluster in which the application is to be deployed. Thus, in response to an inventory process being triggered for a particular cluster of nodes, a virtual IP address or hostname may be retrieved for that cluster. In some implementations, the identifier is received from a user. Thus, a user may provide the identifier to the inventory engine via a user interface if the user wants to deploy software to a cluster associated with the provided identifier. In various implementations, the identifier is retrieved from a predetermined list. Thus, a list of clusters may have been previously generated based on previous selections made by a user, or a previous installation or upgrade of a software application. The predetermined list may be stored in a database system, such as a product database or a storage volume associated with the user interface.

At step 506, the identifier may be used to identify one or more nodes within the one or more clusters. Thus, a system component, such as an inventory engine, may use an identifier to query a cluster resource associated with the identifier to obtain a list of nodes included in the cluster. For example, the inventory engine may use a virtual IP address to query a resource management application running in the cluster, which may maintain a list of nodes currently included in a cluster, and various information associated with the nodes. The information may include an IP address associated with each node. In some implementations, a list of nodes may be maintained by a load balancing server as part of its load balancing operations. Thus, the load balancing server of a cluster may be queried to obtain a list of nodes included in the cluster. Once retrieved, the inventory engine may parse information from the list of nodes to identify all nodes that are currently included in the cluster.

At step 508, information may be retrieved for each of the identified nodes. Thus, a system component, such as an inventory engine, may use one or more identifiers included in the information retrieved at step 506 to identify and retrieve inventory information associated with each node included in a cluster. The identifiers may be an IP address or hostname for each node. Thus, the inventory engine may use the IP address to directly query each node and retrieve inventory information from each node. Alternatively, information for each node may be centrally maintained in a cluster resource which may be queried. For example, a load balancing server may maintain information associated with each node in a cluster in which the load balancing server operates. The inventory engine may use the identifiers to query the load balancing server and retrieve information for each node from the load balancing server. As set forth above with reference to FIG. 4, the information may include various configuration and state information associated with nodes in a cluster. For example, the information may identify a current version of software that is installed on a node and whether or not a node is active or passive.

At step 510, the retrieved information may be stored in a database system. In some implementations, upon retrieving inventory information for each node in a cluster, a system component, such as an inventory engine, may store the retrieved information in a database system. For example, the retrieved information may be stored and maintained in a product database. As discussed in greater detail below with reference to FIG. 6, information may be retrieved from the database system when an application is to be deployed to one or more clusters associated with the information.

Figure 6:
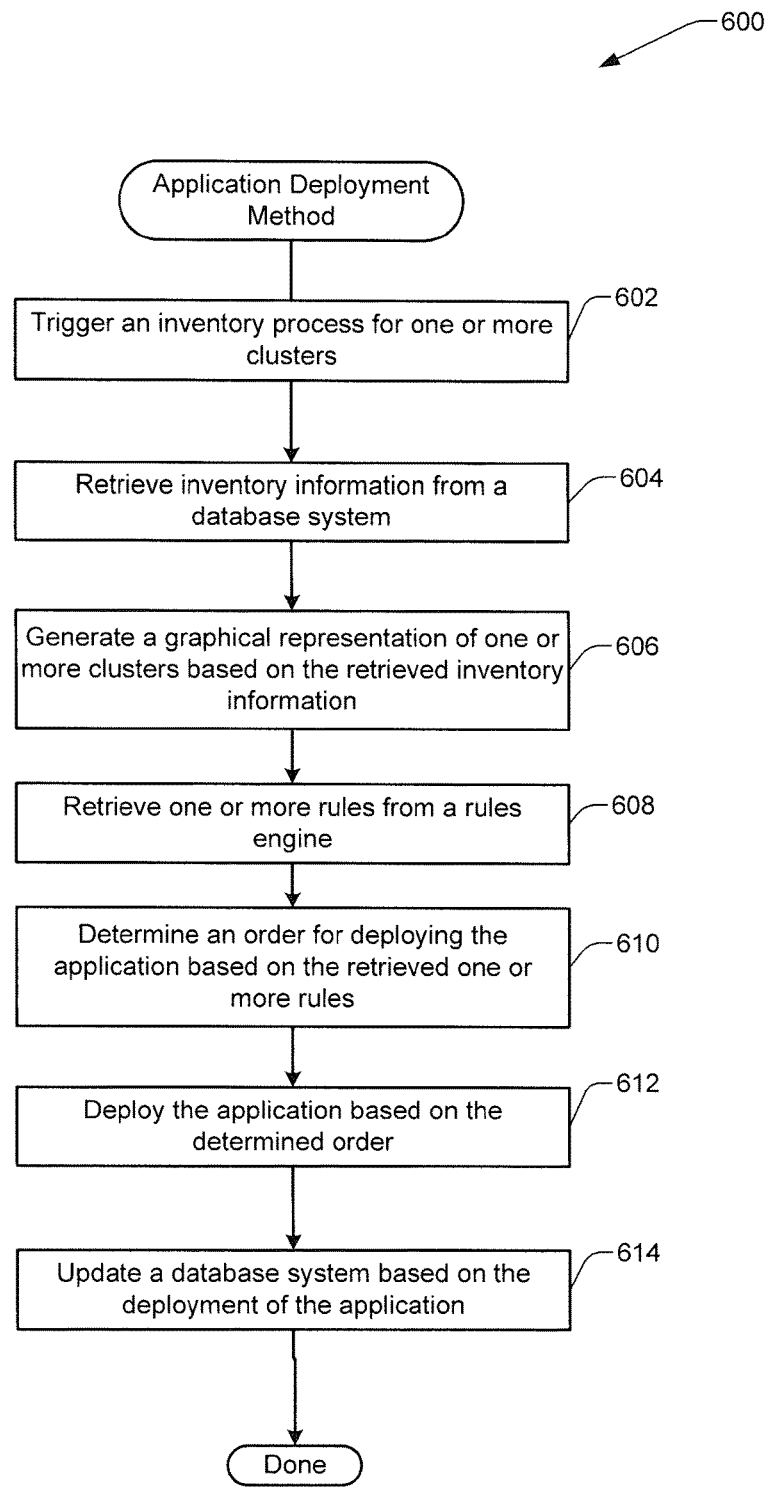
FIG. 6 shows a flowchart of an example of a method for deploying an application to a coherency group, performed in accordance with some implementations.

FIG. 6 shows a flowchart of an example of a method for deploying an application to a coherency group, performed in accordance with some implementations. As similarly discussed above, a coherency group may be a single cluster of nodes or a group of clusters. Some nodes within a coherency group may be active and be used to provide services associated with an application, while other nodes are passive and remain available in case of failure or over-burdening of an active node. Passive nodes that are available to assume functionality of active nodes use the same version of software as the active nodes. If a different version of software is used on a passive node, an error may occur when functionality is transferred to the passive node in the event of failure of the active node. Thus, a system component, such as a core engine, may deploy an application to an entire coherency group to ensure that the entire group is using the same version of a software application, and the most recent version of a software application.

At step 602, an inventory process may be triggered. In some implementations, information about all nodes in the coherency group is collected and processed prior to deploying an application to the coherency group. As previously discussed with reference to FIG. 5, an inventory process may be used to retrieve information about nodes included in one or more clusters. Thus, an inventory engine may retrieve information about one or more nodes in one or more clusters of a coherency group and store the information in a database system. As set forth above, the retrieved information may include information that enables communication with and configuration of the nodes, such as an IP address or host name, and may further include configuration information about the nodes, such as a software version installed on a node and whether or not a node is currently active or passive.

In some implementations, the inventory process is triggered by a user. For example, a system administrator may trigger the inventory process when using an application to deploy software to one or more clusters. Thus, the application may provide the user with a user interface which enables the user to implement and configure the deployment process across multiple clusters of nodes within a coherency group. For example, the user may be presented with a list of coherency groups, clusters, or nodes and a list of available software applications. The user may select a software application to deploy, and may further select one or more clusters to which the selected application should be deployed. In response to receiving the selection, the application may trigger an inventory process to retrieve information that will be used during the deployment process. As set forth above with reference to FIG. 5, an inventory process may be performed, and inventory information may be stored in a database system.

At step 604, inventory information associated with the one or more clusters may be retrieved from the database system. Thus, a system component, such as the core engine, may retrieve information that was collected during the inventory process triggered at step 602. Additionally, inventory information may be retrieved from previous iterations of an inventory process of the same clusters. The core engine may directly query the database system to identify and retrieve relevant inventory information. Relevant inventory information may be identified based on an identifier associated with clusters or nodes, such as an IP address, a virtual IP address, or a system generated unique identifier. Alternatively, the core engine may command the inventory engine to perform the query, package the result into a data object, and send the data object to the core engine. Once the inventory information has been retrieved, the core engine may have access to all relevant inventory information associated with the coherency group in which the software application is to be deployed.

At step 606, a graphical representation of one or more clusters may be generated based on the retrieved information. Thus, one or more components of an inventory engine may use the retrieved information to generate a graphical representation of the one or more clusters of a coherency group from which the information was retrieved. The graphical representation may present a unified view of all nodes included in one or more clusters. Thus, in a single user interface screen, a user may be presented with a diagram of a cluster, a graphical representation of all nodes in the cluster, and retrieved information for each node, such as a software version and whether or not the node is active or passive. Furthermore, the graphical representation may be configured to present the retrieved information in various other formats. For example, the retrieved information may be filtered to generate and display lists of information. Thus, the graphical representation may include a first list that lists all active nodes in a cluster, and a second list that lists all passive nodes in a cluster. It will be appreciated that the information retrieved from the nodes may be filtered and displayed in any way that may be capable of conveying information about one or more clusters in which an application is to be deployed.

In some implementations, the graphical representation is presented to a user at a user interface. As set forth above, the user interface may be part of an application used to deploy software to one or more clusters in a coherency group. The user interface may present generated graphical representations of each cluster to provide the user with a unified view of some or all of the retrieved inventory information. The user may use the information to configure or modify the process of deploying the software. For example, the graphical representation for a cluster of nodes may indicate that some nodes are active, while some nodes are passive. Based on this information, the user may select an order in which the software should be installed on the different nodes.

Figure 7A:
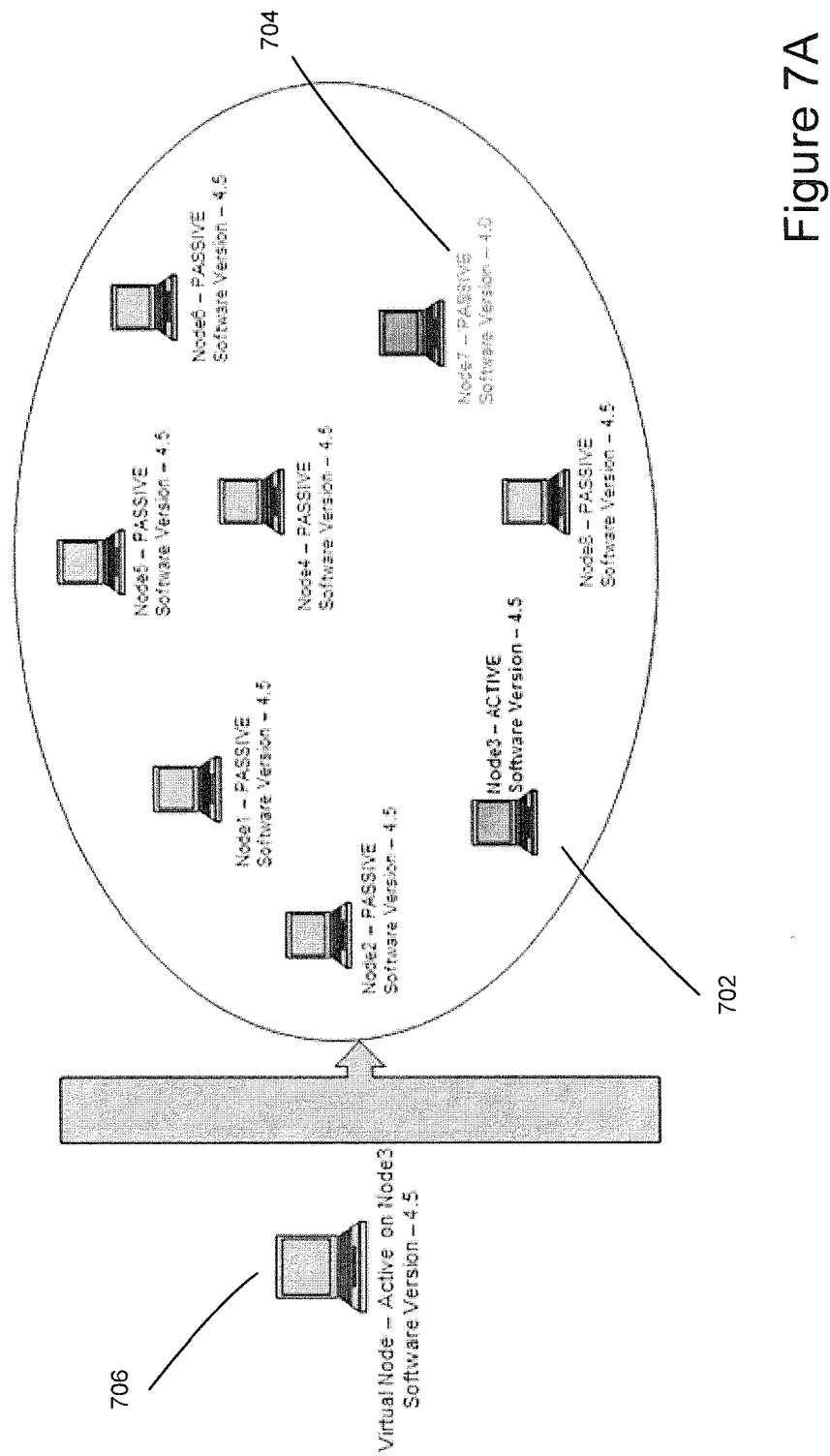
FIG. 7A shows an example of a diagram generated for an Active-Passive cluster, in accordance with some implementations.

FIG. 7A shows an example of a graphical representation generated for an Active-Passive cluster, in accordance with some implementations. As set forth above, an active node may be a node that includes resources that are used to provide services associated with an application deployed to that node. A passive node may be a node that does not currently provide services, but is available if an active node fails or becomes over-burdened, as may be determined by a cluster resource, such as a load balancer. An Active-Passive cluster may be a cluster in which there is one active node, and all other nodes are passive. As shown in FIG. 7A, node 702 is active while all other nodes are passive. In this example, node 702 is identified by the text "Node3". Furthermore, information has been retrieved that indicates that node 702 currently has a software version 4.5 installed. In contrast, node 704 is currently passive. Moreover, node 704 has an outdated software version 4.0 installed. Thus, the graphical representation may provide a single unified view that conveys information about all nodes in a cluster. Furthermore, relevant information may be presented for virtual nodes associated with the cluster. For example, information may be presented as a list associated with virtual node 706. The information may identify which node is currently active and what version of software is installed on the active node. In this example, Node3 is active and has a software version 4.5 installed.

Figure 7B:
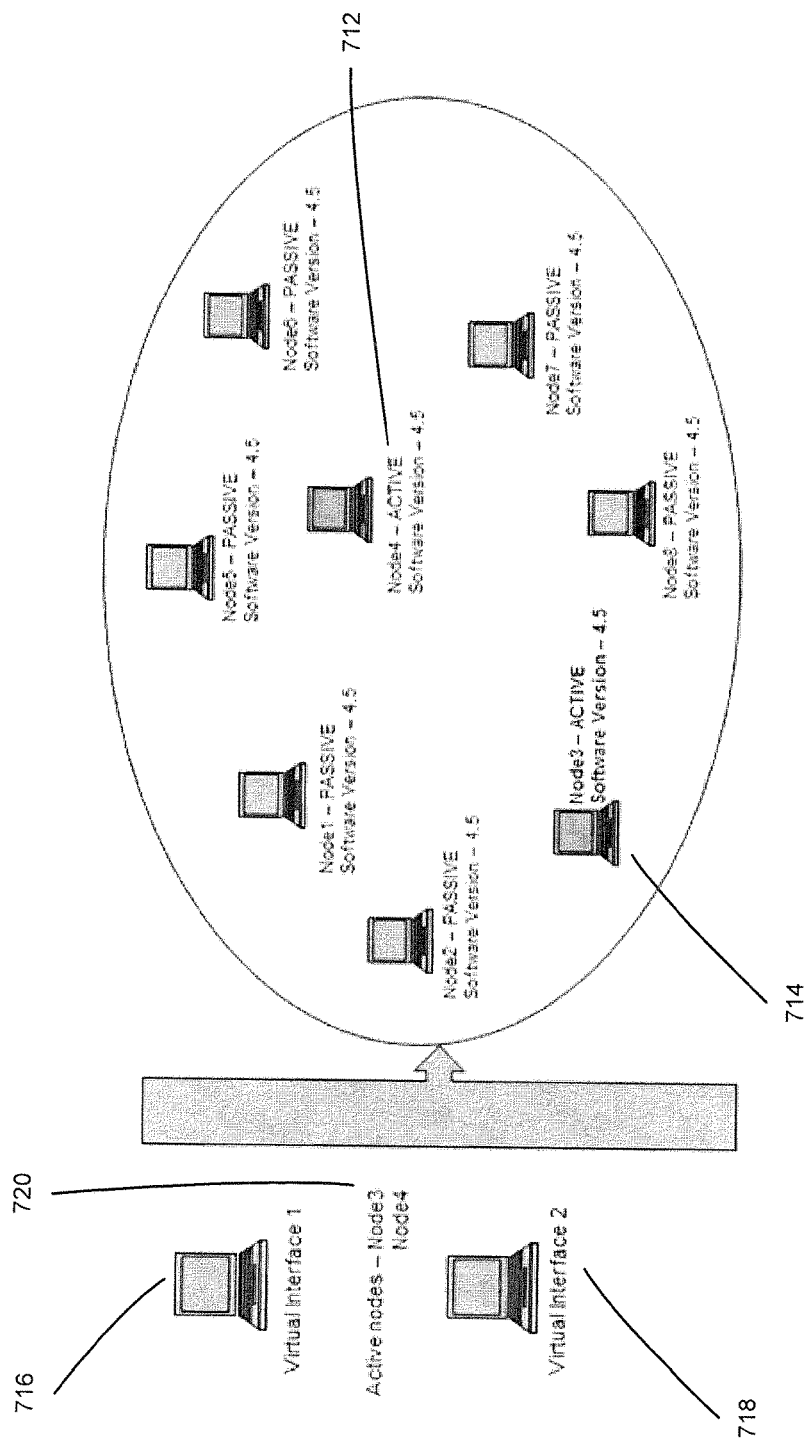
FIG. 7B shows an example of a diagram generated for an Active-Active cluster, in accordance with some implementations.

FIG. 7B shows an example of a graphical representation generated for an Active-Active cluster, in accordance with some implementations. An Active-Active cluster may refer to a cluster in which more than one node in a cluster is used to provide services associated with an application deployed to that cluster. As shown in FIG. 7B, node 712 and node 714 are both active and used to provide services via virtual interface 716 and virtual interface 718. Thus, a list of nodes may be presented that identifies all active nodes in the cluster. In this example, the list identifies node 712 and node 714 and includes the text "Node4" and "Node3". As similarly set forth above, information identifying active nodes and software installed on each node may also be filtered and presented as list 720 associated with virtual interface 716 and virtual interface 718.

In addition to generating a graphical representation, a warning may be generated. Thus, in response to detecting that one or more nodes is non-compliant, a system component, such as an inventory engine or core engine, may generate a warning that may be sent to a user as a message or a user interface component displayed in a user interface screen. A node may be non-compliant because it might not be able to provide failover or load balancing capabilities for other nodes in its coherency group. For example, a non-compliant node may have a different version of software than other nodes in the same coherency group. The warning may include one or more identifiers that identify non-compliant nodes that have obsolete or different versions of software installed. The warning may also include inventory information associated with the non-compliant nodes that provides configuration information associated with the non-compliant nodes. The warning may be integrated into the generated graphical representation. For example, non-compliant nodes may be rendered differently, or in a different color, such as the color red. As set forth above, a user may review the information presented in a user interface screen, such as a graphical representation of the coherency group. The user may receive the warning and use information included in the warning to determine which nodes should receive a software upgrade, and in what order. Alternatively, one or more rules may be used to automatically select nodes to be upgraded. For example, in response to detecting non-compliant nodes, a system component, such as a core engine, may automatically select and upgrade the non-compliant nodes.

Returning to FIG. 6, at step 608, one or more rules may be retrieved from a rules engine. As similarly discussed with reference to FIG. 4, a rules engine may store and maintain one or more rules which may be used to determine an order in which software is installed or upgraded in nodes in a cluster or coherency group. Thus, the rules engine may determine a most efficient or effective order in which software should be deployed to nodes within one or more clusters of a coherency group. Moreover, the rules engine may provide one or more rules that may be used to determine an order that is compatible with failover and load balancing capabilities of the coherency group.

In some implementations, the rules are user-defined rules. Thus, a user may define an order in which software is to be deployed to one or more nodes. The user may specify one or more conditions which may be used to determine an order associated with the one or more nodes. The user may write or generate the entire rule. Alternatively, one or more system-generated rules may be selected and edited based on an input received from a user. Moreover, a user may specify whether or not software should be deployed to several nodes serially or in parallel. If a user indicates that software application should be deployed in parallel, the user may be presented with one or more options to configure the parallel deployment of the software application. For example, the user may provide an input to a user interface that indicates how many nodes should be updated in parallel, and how many parallel threads should be provided during the deployment of the software application.

In various implementations, the rules may be system-generated rules. Thus, one or more rules may be generated and stored in a rules engine as part of a setup or configuration process of the system used to deploy the software application to the coherency group. Examples of system-generated rules may be default rules established by a system administrator or a software developer. The default rules may be one or more rules that determine an order for the deployment of a software application based on one or more default conditions. For example, a default rule may specify that passive nodes in a cluster are updated prior to active nodes. Thus, the default rule may specify that passive nodes are updated first, then active nodes are taken offline and updated subsequently.

Furthermore, a default rule may be dynamically changed or modified based on an input received from a user at a user interface. For example, if an active node is to be taken offline during deployment of the software application, a user may be prompted for an input that identifies a failover node for the active node that will be taken offline. If no failover node is specified, the default rule may specify that the passive nodes should be upgraded and a notification should be generated that informs the user that the passive nodes have been updated and the active nodes are pending for upgrade. In some implementations, the notification is configured to prompt the user for an action to be taken. Thus, after the passive nodes have been updated and the notification has been generated and presented at a user interface, the user may identify one or more failover nodes at that time, or take no action at all. It will be appreciated that any portion of one or more default rules may be configurable or modifiable. Thus, a user may edit or modify an existing data table that stores one or more default rules to create one or more custom rules. The custom rules may be stored and applied globally, or may be applied to a single node, cluster, or coherency group.

Some examples of rules that may be stored and maintained by a rules engine are illustrated in Table 1 provided below. It will be appreciated that one or more of the example rules provided in Table 1 may be system-generated or user defined.

TABLE 1

| Rule Number | Rule | Default setting | Option | Description |
|---|---|---|---|---|
| Rule 1 | Preferred list | Inventory Order | 1) Inventory Order 2) User defined list | Contains a list identifying an order in which the nodes should be upgraded |

TABLE 1-continued

| Rule Number | Rule | Default setting | Option | Description |
|---|---|---|---|---|
| Rule 2 | Move Active node to Passive for software deployment | Yes | 1) Yes 2) No | Active node will be made Passive during upgrade and again switched back to Active after deployment |
| Rule 3 | Serve first (Active/Passive) | Passive first | 1) Passive first 2) Active first | All Passive nodes will be upgraded first, then Active nodes |
| Rule 4 | Deployment failure | Notify and continue | 1) Notify & Continue 2) Abort & Notify 3) Rollback and Notify | Determines what action should be taken upon software deployment failure |
| Rule 5 | Software version discrepancy | Upgrade/Install automatically | 1) Upgrade automatically 2) Notify | Determines what should be done if a node(s) is found with mismatched software version |
| Rule 6 | Software order | NA | NA | A user may specify the order in which a software upgrade should take place |
| Rule 7 | Schedule | NA | NA | Schedule of when deployment may take place |

In some implementations, a rule, such as Rule 1 shown in Table 1, is used to determine an order for deployment of software based on a predetermined order stored in a list. For example, a user may have previously defined an order for a particular cluster in which software is to be installed on the nodes. Alternatively, the order in which the nodes were inventoried may be used. A rule, such as Rule 2, may specify a particular action to be taken for a node based on its current operational state. For example, if a node is active, it may be switched to passive, upgraded, and returned to an active state. A rule, such as Rule 3, may determine an order in which nodes are upgraded based on their current operational status. For example, passive nodes may be upgraded first, and then active nodes may be taken offline and upgraded. As similarly discussed above, in a cluster that implements load balancing and failover capabilities, all nodes can't be taken offline and upgraded at the same time without disrupting functionality of software executing in the cluster. Therefore, by selectively upgrading identified passive nodes first and then upgrading active nodes, all nodes in a cluster may be upgraded, and functionality of software executing in the cluster is not disrupted.

In various implementations, a rule, such as Rule 4, generates a notification that notifies a user that a failure has occurred during the deployment process. Thus, a system-generated message may provide a user with information about one or more nodes on which software has failed to be installed, and information about the type of installation failure. Alternatively, the deployment process may be aborted, or the node maybe rolled back to a previous software version. A rule, such as Rule 5, may be used to automatically upgrade software on a node in response to determining that the software is obsolete or different than the current version of software to be deployed. Alternatively, in response to detecting the discrepancy, the system may generate a message which prompts a user to take an action. A rule, such as Rule 6, may prompt a user to specify an order in which the software is deployed during the process of deployment. Moreover, a rule, such as Rule 7, may perform the installation or upgrade according to a predetermined schedule. Thus, the software may be scheduled to be deployed to the nodes at a later time.

At step 610, an order for deploying the application may be determined based on the retrieved one or more rules. Accordingly, the core engine may apply one or more selected rules to a list of nodes included in the coherency group. As set forth above with reference to step 604, retrieved inventory information may include one or more identifiers, such as host names or IP addresses, that identify one or more nodes in a coherency group, and various attributes associated with each node, such as an installed software version. A system component, such as a core engine, may retrieve one or more rules from the rules engine and apply the rules to identified nodes within a coherency group based on the retrieved inventory information. Thus, all nodes identified by the inventory process triggered at 602 may be arranged in an ordered list. The order may be determined based on inventory information associated with the identified nodes. For example, if a default rule is selected, the default rule may generally indicate that passive nodes should be updated prior to active nodes. The core engine may analyze retrieved inventory information to determine which of the identified nodes are active and which of the identified nodes are passive. The passive nodes may be positioned at the top of the list and active nodes may be positioned at the bottom of the list.

In some implementations, the rule that is applied is selected based on an input received from a user. Thus, during a deployment process, a user interface may be presented to the user. The user interface may prompt the user to select a rule to be applied to the nodes within the coherency group. In various implementations, the user is presented with an option of creating a new rule or modifying an existing rule. Thus, various options may be provided that allow a user to customize one or more rules to be implemented when determining an order in which software is deployed to nodes within the coherency group. The user interface may receive an input from the user that includes a selection of one or more rules. A system component, such as a core engine, may apply the rule to the identified nodes in the coherency group to determine an order in which a software application should be installed on the nodes in the coherency group.

In various implementations, the order may be determined based, at least in part, on software dependencies associated with software applications installed on one or more nodes in the coherency group. For example, a first software application to be upgraded on a node may have a second software application installed on the node that depends on the first software application. In this example, upgrading the first software application may cause dependency related errors in the execution of the second software application. Accordingly, an upgraded version of the second software application may be added to the determined order so that all software applications that depend on the first software application are upgraded as well, and no dependency related errors occur when the updated version of the first software application is implemented.

At step 612, the application may be deployed based on the determined order. Thus, application software may be installed on one or more nodes in a coherency group based on the order determined at step 610. The nodes may be taken offline and software may be installed on the nodes according to the determined order. One or more system components, such as a core engine, may store and maintain a log of changes made during deployment of the software application. Thus, the log may identify which nodes had software installed, in what order, and what software was installed.

At step 614, the database system may be updated based on the deployment of the application. Thus, inventory information associated with the coherency group to which the software application was deployed may be updated to reflect the most recent changes made to the nodes within the coherency group. For example, information identifying system and configuration changes stored in the log generated at step 612 may be stored and integrated with other inventory information stored in the database system. Accordingly, the most recent inventory information associated with a coherency group may be stored in a database system, such as a product database. Storing and maintaining the inventory information in this way may minimize redundancy within an inventory process in a future iteration of a software application deployment process.

In some implementations, updated inventory information associated with a node may be stored in a separate data object or data entry than previously stored inventory information associated with that same node. Moreover, metadata associated with the inventory information may be stored in the database system as well. For example, a timestamp indicating when an upgrade occurred may be stored with inventory information identifying which node was upgraded and to what version of a software application. By maintaining older inventory information for nodes that have been updated, the database system may store a historical account of all upgrades that have been performed by a centralized deployment engine on nodes within a coherency group. Other types of information may be logged and stored as well, such as previous failover events and active/passive status changes. One or more system components may be configured to generate a report that includes the historical data. The report may be generated in response to receiving a request from a user or automatically upon completion of a deployment process. Furthermore, the report may be presented to the user at a user interface.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for deploying a software application to a plurality of nodes, the method comprising:
   identifying the plurality of nodes in one or more clusters of nodes, the one or more clusters of nodes functioning as a single unit providing failover and load balancing for execution of a software application;
   retrieving inventory information for each node of the plurality of nodes, the inventory information providing configuration and state information associated with each node, wherein the state information specifies whether each node is an active node or a passive node in a failover and load balancing cluster, wherein each active node is being used to provide services associated with the application and each passive node is not being used to provide services, each passive node being available to provide services associated with the application if an active node fails or is overburdened;
   determining an order of the plurality of nodes for deploying the software application by applying one or more rules associated with deploying the software application and retrieved from a rules engine storing a plurality of rules to the retrieved inventory information, the order identifying a sequence in which the software application is deployed to the plurality of nodes; and
   deploying the software application to the plurality of nodes based on the determined order.

2. The method of claim 1, wherein the order is compatible with failover and load balancing capabilities of the one or more clusters of nodes.

3. The method of claim 1, wherein the one or more rules are user-defined rules.

4. The method of claim 1 further comprising generating a graphical representation of the one or more clusters of nodes based on the inventory information retrieved from the plurality of nodes.

5. The method of claim 4, wherein the graphical representation displays active nodes and passive nodes in the one or more clusters of nodes.

6. The method of claim 1 further comprising generating a warning that indicates that at least one node of the plurality of nodes has a version of the software application that is non-compliant with software installed on other nodes in the one or more clusters of nodes.

7. The method of claim 1, wherein the order is determined based, at least in part, on a dependency between the software application that is being deployed and another software application.

8. The method of claim 1, wherein the one or more nodes are identified based on a virtual internet protocol address associated with the one or more clusters.

9. The method of claim 1, wherein the inventory information retrieved from the plurality of nodes includes an internet protocol address or a hostname associated with each node of the plurality of nodes.

10. The method of claim 1, wherein a node is a physical node in a communications network that has an associated internet protocol address.

11. The method of claim 1, wherein inventory information associated with each node of the plurality of nodes is retrieved from at least one load balancer.

12. A computer program product comprising computer-readable program code stored in a non-transitory computer-readable medium to be executed by one or more processors when retrieved from a non-transitory computer-readable medium, the program code including instructions to:
   identify a plurality of nodes in one or more clusters of nodes, the one or more clusters of nodes functioning as a single unit providing failover and load balancing for execution of a software application;
   retrieve inventory information for each node of the plurality of nodes, the inventory information providing configuration and state information associated with each node, wherein the state information specifies whether each node is an active node or a passive node in a failover and load balancing cluster, wherein each active node is being used to provide services associated with the application and each passive node is not being used to provide services, each passive node being available to provide services associated with the application if an active node fails or is overburdened;

determine an order of the plurality of nodes for deploying the software application by applying one or more rules associated with deploying the software application and retrieved from a rules engine storing a plurality of rules to the retrieved inventory information, the order identifying a sequence in which the software application is deployed to the plurality of nodes; and deploy the software application to the plurality of nodes based on the determined order.

13. The computer program product of claim 12, wherein the order is compatible with failover and load balancing capabilities of the one or more clusters of nodes.

14. The computer program product of claim 12, wherein the steps further comprise:

generating a graphical representation of the one or more clusters of nodes based on the inventory information retrieved from the plurality of nodes, wherein the graphical representation displays active nodes and passive nodes in the one or more clusters of nodes.

15. The computer program product of claim 12, wherein the inventory information retrieved from the plurality of nodes includes an internet protocol address or a hostname associated with each node of the plurality of nodes.

16. The computer program product of claim 12, wherein inventory information associated with each node of the plurality of nodes is retrieved from at least one load balancer.

17. A system for deploying a software application to a plurality of nodes comprising:

a processor; and one or more stored sequences of instructions which, when executed by the processor, cause the processor to:

identify the plurality of nodes in one or more clusters of nodes, the one or more clusters of nodes functioning as a single unit providing failover and load balancing for execution of a software application;

retrieve inventory information for each node of the plurality of nodes, the inventory information providing configuration and state information associated with each node, wherein the state information specifies whether each node is an active node or a passive node in a failover and load balancing cluster, wherein each active node is being used to provide services associated with the application and each passive node is not being used to provide services, each passive node being available to provide services associated with the application if an active node fails or is overburdened;

determine an order of the plurality of nodes for deploying the software application by applying one or more rules associated with deploying the software application and retrieved from a rules engine storing a plurality of rules to the retrieved inventory information, the order identifying a sequence in which the software application is deployed to the plurality of nodes; and deploy the software application to the plurality of nodes based on the determined order.

18. The system of claim 17, wherein the order is compatible with failover and load balancing capabilities of the one or more clusters of nodes.

19. The system of claim 17, wherein the steps further comprise:

generating a graphical representation of the one or more clusters of nodes based on the inventory information retrieved from the plurality of nodes, wherein the graphical representation displays active nodes and passive nodes in the one or more clusters of nodes.

20. The system of claim 17, wherein the inventory information retrieved from the plurality of nodes includes an internet protocol address or a hostname associated with each node of the plurality of nodes.

* * * * *